Aug. 13, 1929.  S. A. WILLIAMS ET AL  1,724,154
MACHINE FOR MAKING SHEET PRODUCTS
Filed March 1, 1927  2 Sheets-Sheet 2
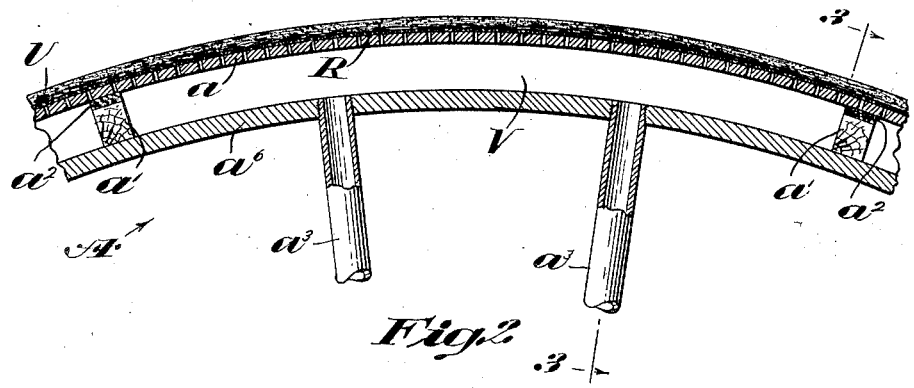
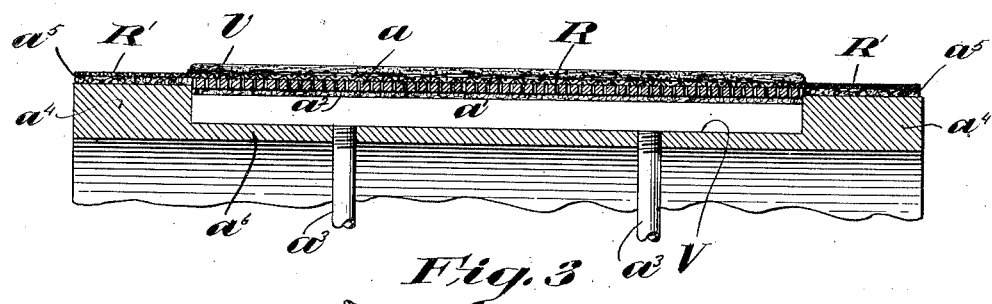
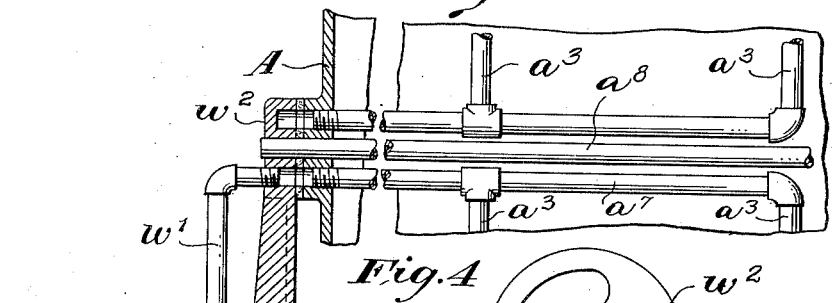
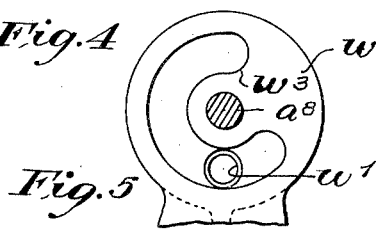
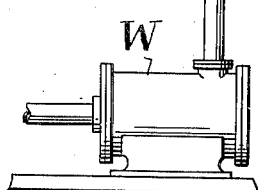
Inventors
Samuel A. Williams
Thomas C. Pond
by Roberts, Cushman & Woodberry,
Attys.

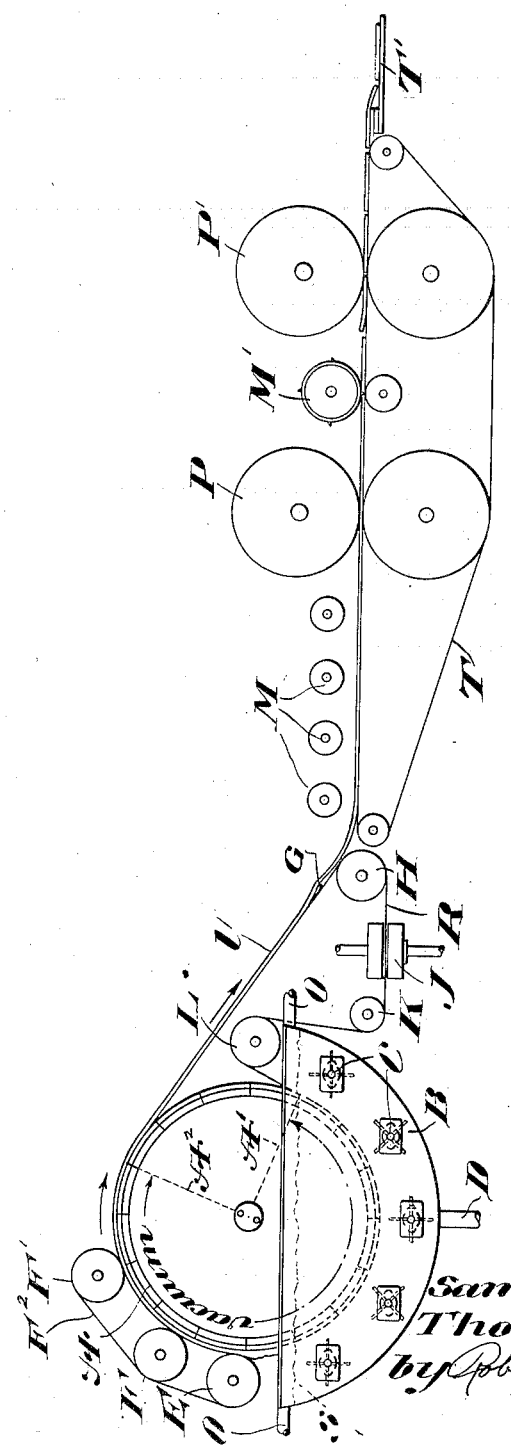

Patented Aug. 13, 1929.

1,724,154

UNITED STATES PATENT OFFICE.

SAMUEL A. WILLIAMS AND THOMAS C. POND, OF WAUKEGAN, ILLINOIS, ASSIGNORS, BY MESNE ASSIGNMENTS, TO JOHNS-MANVILLE, CORPORATION, OF NEW YORK, N. Y., A CORPORATION OF NEW YORK.

MACHINE FOR MAKING SHEET PRODUCTS.

Application filed March 1, 1927. Serial No. 171,783.

Our invention relates to the manufacture of concrete sheets adapted, when finally set, to be used as roofing and siding, shingles for buildings, wallboards, floor covering, etc., and particularly relates to the manufacture of such concrete sheets which comprise fibrous constituents in association with a setting cement; and, whatever be the specific constitution of the sheet, to the continuous production of such concrete sheet material in a band emitted from the making machine and adapted to be cut into pieces of suitable length while still "green" and plastic.

Heretofore, sheet material for shingles, wallboard, tilling, etc. has been manufactured in two ways, namely: (1) by forming a paper-like web of fibre (usually asbestos fibre) with hydraulic cement, and then building up a layer similar to millboard on a roll or drum, cutting the laminated board from the drum and flattening the same, while green, under pressure, until the cement has set; (2) by forming a dry, or at most a damp mixture of fibre and cement, making a sheet layer of this mix on a continuously moving belt conveyor, wetting and compressing it as it travels, cutting pieces of suitable length from the continuously emitted sheet, stacking the pieces alternately with steel plates in a press, where they remain until the cement has set.

The first method offers the advantages of a thoroughly wet mix and involves the disadvantages incident to laminated structure; it is, moreover, relatively slow in production rate. The second method is inferior with respect to the initial mix, but avoids the defects due to lamination and is relatively prolific in production. Our invention aims to avoid the compromises involved in the heretofore practiced methods, and secures the advantages of a thoroughly wet initial mix and of freedom from laminations as well as permitting the production of the sheet material as rapidly as the dry or semi-dry mix method. The resulting product possesses mechanical strength in at least as high degree as the laminated millboard type of prior product and has distinguishing structural features of importance and value not possessed by either of the pre-existing types of material.

In the annexed drawings which illustrate that specific form of machine or apparatus which we believe to be the best adapted to the purposes stated, Fig. 1 is a diagrammatic representation in longitudinal elevation of the fibre concrete sheet making machine;

Fig. 2 is a fragmentary cross section showing a portion of the segmental vacuum box cylinder of the machine;

Fig. 3 is a section taken on the line 3—3 of Fig. 2.

Fig. 4 is a broken transverse sectional view showing the arrangement of the valve mechanism and ducts for supplying suction to the suction drum; and Fig. 5 is an elevational detail of a portion of the mechanism shown in Fig. 4.

The machine will first be described with reference to the accompanying drawings in order to facilitate a subsequent understanding of the process and product. This machine, as shown in Fig. 1, comprises a vacuum cylinder A mounted to rotate partly immersed in a stuff tank B in which the wet mix is automatically maintained at about the level marked S, the feed of stuff at the inlet D being automatically controlled and any overflow of the same being received by outlets O. The cylinder A comprises an outer perforated shell $a$ (Figs. 2 and 3) and a smaller cylindrical casing $a^6$ providing a circumferential space therebetween which is divided by segmental partitions $a^1$ into chambers V. The pressure within these chambers is raised or lowered through radial ducts $a^3$ which connect with suitable means for inducing a pneumatic pressure differential which is controlled by the usual valvular apparatus located near the axis of rotation of the cylinder. Between the partitions $a^1$ and the perforated screen plate $a$ are disposed narrow felt pads $a^2$ which serve to seal each chamber V from its neighbors and to prevent excessive leakage of fluid under pressure differential from one vacuum chamber to the next, although permitting a gradual variation in the pressure differential between adjoining zones upon the periphery of the drum rather than sharply defined differences which would occur if the segmental partitions were entirely impervious to the passage of air and if there were no suction acting upon the deposited layer directly above these partitions, this effect being aided by the provision of perforations in plate $a$ directly over pads $a^2$. At each end of the cylinder are circumferential flanges or rims $a^4$ (Fig. 3) upon which circumferential felt pads $a^5$ are secured, these pads being of such thickness that their outer surfaces lie substantially flush with the outer surface of the perforated plate $a$.

One arrangement of ducts and valve means for controlling the supplying of suction to pipe $a^3$ and to the chambers V is illustrated more particularly in Figs. 4 and 5. Suitable transverse pipes $a^7$ connect with the radial ducts $a^3$ and terminate in a suitable plate at the end of drum A. A valve plate $w^2$ is arranged to have an opening register with successive openings into the pipes $a^7$. For this purpose the plate $w^2$ is provided with a segmental passage $w^3$ corresponding to the portion of the chambers V which are being supplied with a vacuum at any given time. Passage $w^3$ is connected by means of a pipe $w^1$ with a suitable suction pump W. It is evident that the drum A is mounted on the axle $a^8$ which passes centrally through the fixed plate $w^2$ which may form a part of the drum supporting standard.

A foraminous filtering medium or screening ribbon R in the form of an endless belt made of fine woven wire of about 60 mesh, wraps around the segmental vacuum cylinder A and also around guide rolls H, K, and L; the length of the belt R and the disposition of the guide rolls being such that the filtering medium extends outside the stuff tank and travels from the upper portion of the cylinder A outwardly to the guide roll H and then back over rolls K and L, again to come into contact with the cylinder A. The effective screening area of ribbon R is restricted to a band of substantially the same width as the chambers V in the cylinder A, this result being attained in the following manner: A rubber composition is rolled into the mesh of the ribbon R along each margin and is there vulcanized to form impervious marginal bands $R^1$ which are designed to engage circumferential pads $a^5$ upon the vacuum cylinder (see Fig. 3).

A suitable number of rotary agitators C are arranged to keep the solid materials uniformly mixed and suspended in a body of water in the stuff tank. Three rolls for operating on the material carried by the screen ribbon R are shown at E and F, F'; E being a smoothing roll bearing lightly on the material to make its surface substantially even, whereas the rolls F, F', bear on the said material with considerable pressure, for example, approximately 40 pounds per square inch of effective rolling contact.

Preferably a belt $F^2$ of felt or similar yieldable material is wrapped around these rolls in order to permit the more even application of pressure to the wet layer of deposited material.

An endless conveyor belt T, threaded over suitable rolls and driven at a speed similar to that of screen ribbon R, is arranged with one end roll closely adjacent to the guide roll H in order to receive the material formed on the ribbon R and carry it through such final operations as may be determined on. These are, for instance, the sprinkling of comminuted material, such as slate, as from drums at M; recompression to roll such comminuted material into the surface of the concrete sheet U, rolls for this purpose being indicated at P, P'; or means such as the rotating cutter roll M' for cutting the continuous sheet of concrete material into pieces of suitable length while means for trimming the longitudinal edges of the sheet may be provided at any suitable point. The cut pieces may then be stacked on the take-off table shown at $T^1$.

While the character and proportions of materials used as well as the various operating conditions may be considerably varied, for example, the ratio of suspended solids to water may vary from 1 to 3 to 1 to 5, the following description illustrates a typical satisfactory example of the process: The wet stuff comprising water 75%, screened asbestos fibre 5%, Portland cement 20% is charged into the stuff tank B, the segmental cylinder A being rotated at a circumferential speed of about 10 feet per minute in the direction indicated by the full-line arrow (Fig. 1) and vacuum from 15 inches to 18 inches (mercury) being maintained in the segmental chambers V during their passage from the point $A^1$ to the point $A^2$.

As each of the vacuum chambers V is initially inductive upon rotation to a point $A^1$, the wet stuff in the tank is drawn to and held on the surface of the screen ribbon R. Asbestos fibres, which normally extend in all directions in the agitated mix, are drawn to the screen ribbon so that they generally tend to lie substantially parallel to the plane of the ribbon although they are not drawn into exact parallelism but rather form a reticulated or matted mass. The stuff water drawn into a vacuum chamber V at this initial point will contain a considerable quantity of Portland cement as may be observed by its milky appearance. Presently, however, as the region of the deposition of cement fibres progresses through the stuff tank, the fibres which are first matted against the surface of the screen ribbon R operate effectively to filter out the stuff water substantially clear, leaving the Portland cement in very small particles deposited with asbestos fibres. The accumulative deposit of fibre and cement upon the screen ribbon may thus have a resulting thickness of about ⅜ of an inch as it emerges from the liquid level S in the stuff tank. As the vacuum sector extends to and beyond the upper limit of rotational movement, this layer of concrete material clings to the ribbon R and continues to give up water to ducts $a^3$, passes under the smoothing roll E whereby any irregularities or projecting fibres are smoothed down, thence to and under the pressure rolls F, F', which express water from the sheet of concrete material and compact it, and thence is carried by the ribbon R from the cylinder A to the lower and outer limit of movement of the ribbon at the guide roll H. A stripping knife G is arranged above and near the guide roll H and lies across the surface of the ribbon R to separate the sheet of concrete material U from the ribbon. When the machine is started the leading end of the continuously emitted sheet U may be manually carried over to conveyor belt T and thereafter the material U continues to traverse the gap between ribbon R and the conveyor belt.

The materials used in making the concrete sheet are of such a character that they tend to accumulate on moving screen R and would very soon clog its meshes unless, as we have provided, there were means for cleaning the screen while it is in movement from the point where it tangentially leaves the surface of the cylinder and the point where it again tangentially rejoins the surface. The extension of the endless screen ribbon R from its point of departure from the drum to a considerable distance away from it, thence to return to the point of reunion with the said drum, affords facilities for cleaning the screen during this interval in its generally rotative movement without dilution of the mix in stuff tank B. Thus as shown in Fig. 1, there is provided a water jet box or screen washer at J which cleans off and washes the mesh of screen ribbon R so that, when it rejoins the perforated surface of cylinder A, it is just as effective as a screening factor as it was at the first stage of its operation. The constant cleaning of successive portions of the ribbon R avoids necessity of interruption of the process to clean the filtering medium and thus permits the process to be continuous and, since clogging of the wire mesh is avoided, it permits a uniform pressure differential about the periphery of the vacuum cylinder and the manufacture of a uniform product.

The provision of felt pads $a^2$, which permit a limited leakage in air pressure, avoids the occurrence of breaks in the continuous layer of fibre-cement material which is formed on cylinder A, while the rubber selvage elements R' cooperate with the circumferential pads $a^5$ to prevent excess tendency toward leakage at the ends of the drum, this function being facilitated by the tendency of the stuff to collect and clog the interstices of the felt.

The sheet material may be taken from table T' and allowed finally to set under any desired conditions, as, for example, between metal plates under high pressure. The resulting sheet product will be somewhat richer in fibre adjoining one of its faces while throughout the remainder of its mass the materials may occur substantially as in the original mix. The fibres generally lie in planes substantially parallel to the faces of the sheet, although extending in various directions in said planes. Due to the constant agitation of the mix and the gradual upbuilding of the fibre-cement layer under water there is no sharp line of demarkation between strata of the finished sheet nor any tendency of the material to bunch or laminate or to have air pockets therein, which would tend to occur if the material were not initially formed under water.

We claim:

1. In a machine of the class indicated, the combination of a stuff tank, a rotatable cylinder, means for supplying successive circumferential zones of the cylinder with a pneumatic pressure differential, means partially sealing adjoining zones from each other whereby there is no sharp difference in the pressure of adjoining zones, an endless foraminous belt wrapped around said cylinder and extending to a point spaced therefrom, said belt being adapted to receive a layer of material deposited thereon by the pressure differential, means for receiving the material deposited on the belt, and a factor for cleaning the belt during its passage from the last-named means to a point where it rejoins the cylinder.

2. In a machine of the class indicated, the combination of a stuff tank, a rotatable cylinder, segmental chambers arranged about the periphery of the cylinder and adapted to be successively supplied with a pneumatic pressure differential during a portion of their rotary movement, a perforated drum surrounding said chambers and adapted to transmit said pressure differential to the outside of the drum, successive segmental chambers being separated by material which is partially impervious to the passage of air, whereby there is no sharp difference in the pressure adjoining adjacent portions of the perforated surface, an endless foraminous belt wrapped around said cylinder and extending to a point spaced therefrom, said belt being adapted to have a layer of material deposited thereon by the pressure differential, means spaced from the cylinder and adapted to receive the layer deposited on the belt, and a factor for cleaning the belt during its passage from the last-named means to a point where it rejoins the drum.

3. In a machine of the class indicated, the combination of a stuff tank, a rotatable cylinder, segmental chambers arranged about the periphery of the cylinder and adapted to be supplied with a pneumatic pressure differential during a portion of their rotary movement, a perforated drum surrounding said chambers and adapted to transmit said pressure differential to the outside of the cylinder, successive segmental chambers being separated by material which is partially impervious to the passage of air, whereby there will be no sharp difference in the pressure adjoining adjacent portions of the perforated surface.

4. In a machine of the class indicated, the combination of a stuff tank, a rotatable cylinder, means for supplying a segmental portion of the circumferential surface of the drum with a pneumatic pressure differential, continuous circumferential elements at either end of the cylinder, an endless foraminous belt wrapped around said cylinder and extending to a point spaced therefrom, means upon the belt adapted to cooperate with the circumferential elements upon the cylinder to form a seal substantially preventing leakage of pressure differential about the ends of the cylinder, said belt being adapted to receive a layer of material deposited thereon by the pressure differential, means spaced from the cylinder to remove said layer of deposited material, and a factor for cleaning the belt during its passage from the last-named means to a point where it rejoins the drum.

5. In a machine of the class indicated, the combination of a stuff tank, a rotatable cylinder, means for supplying a segmental portion of the circumferential surface of the drum with a pneumatic pressure differential, yieldable circumferential strips at either end of said surface, an endless foraminous belt wrapped around said cylinder and extending to a point spaced therefrom, resilient marginal strips upon the belt adapted to engage the yieldable circumferential strips upon the cylinder to form a seal substantially preventing leakage of pressure differential about the ends of the cylinder, said belt being adapted to receive a layer of material deposited thereon by the pressure differential, and a factor for cleaning the belt during its passage from said last-named means to a point where it rejoins the drum.

6. In a machine of the class indicated, the combination of a stuff tank, a rotatable cylinder, segmental chambers about the periphery of said cylinder adapted to be successively supplied with a pressure differential during a portion of their rotary movement, a perforated drum surrounding said chambers and adapted to transmit said pressure differential to the area outside the drum, partitions between said chambers being partially impervious to pressure differential whereby the change in pressure adjoining adjacent chambers is gradual, an endless foraminous belt wrapped around said cylinder and extending to a point spaced therefrom, resilient marginal portions of said belt substantially impervious to air passage, and flanges upon said cylinder adapted to engage said marginal portions to comprise a seal against leakage of pressure differential, means for receiving a layer of material deposited on said belt by the pressure differential, and a factor for cleaning the belt during its passage from the last-named means to a point where it rejoins the drum.

7. In a machine of the class indicated, the combination of a stuff tank, a rotatable cylinder, segmental chambers about the periphery of said cylinder adapted to be successively supplied with a pressure differential during a portion of their rotary movement, a perforated drum surrounding said chambers and adapted to transmit said pressure differential to the area outside the drum, partitions between said chambers being partially impervious to pressure differential whereby the change in pressure adjoining adjacent chambers is gradual, an endless foraminous belt wrapped around said cylinder and extending to a point spaced therefrom, resilient marginal portions of said belt substantially impervious to air passage, and flanges upon said cylinder adapted to engage said marginal portions to comprise a seal against leakage of pressure differential, and means spaced from the cylinder for removing a layer of material deposited on the belt by the pressure differential.

Signed by us at Waukegan, Illinois, this 23 day of Feb., 1927.

SAMUEL A. WILLIAMS.
THOMAS C. POND.